Jan. 30, 1945.   P. G. HOLT   2,368,221
GYROSCOPIC INSTRUMENT AND INDICATOR THEREFOR
Filed July 15, 1943
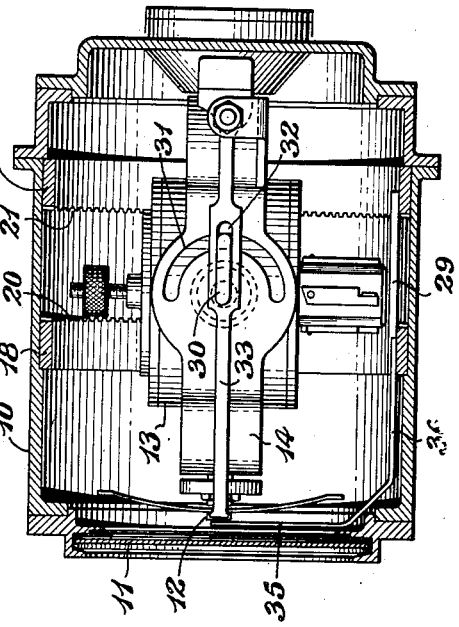
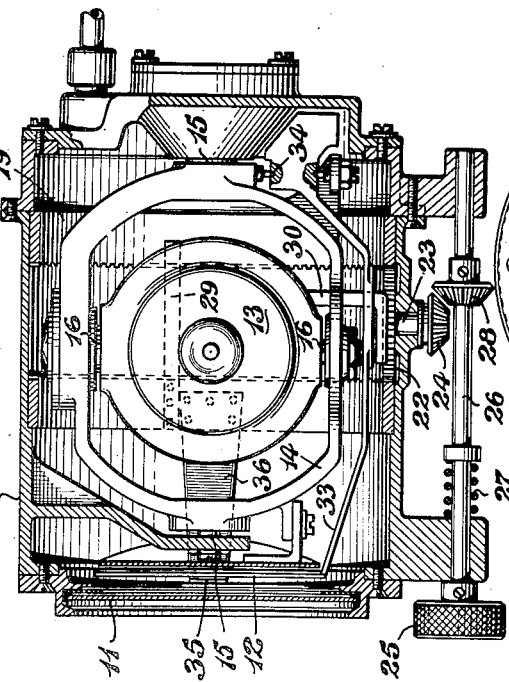
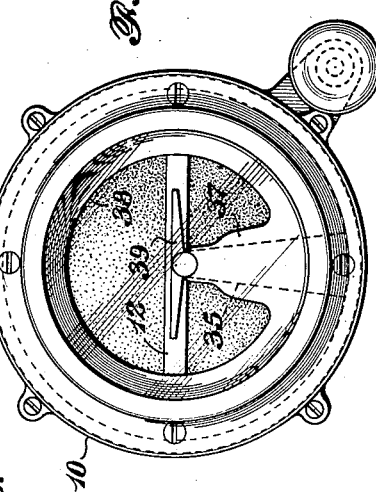
INVENTOR
PLINY G. HOLT,
BY
ATTORNEY Patented Jan. 30, 1945

2,368,221

UNITED STATES PATENT OFFICE 2,368,221

GYROSCOPIC INSTRUMENT AND INDICATOR THEREFOR

Pliny G. Holt, United States Navy

Application July 15, 1943, Serial No. 494,885

9 Claims. (Cl. 116—124)

(Granted under the act of March 3, 1883, as amended April 30, 1928; 370 O. G. 757)

This invention relates to improvements in gyroscopic flight instruments such as, for example, the gyroscopic artificial horizon.

In artificial horizons used in military aircraft, it is customary to provide the same with means for holding the gyroscope and its associated gimbal system in a fixed or "caged" position when the instrument is not being used. Such caging is particularly needed when the aircraft is engaged in aerobatics. Unless the gyroscope is caged during aerobatics, it will "tumble" or precess when it reaches its operating limits and cause severe loads on the gimbals and bearings of the instrument. Furthermore, when an instrument of this kind has tumbled, steady level flight for ten or more minutes is often necessary before the instrument returns to a normal indicating position.

By the use of the caging device, the pilot can fix the instrument in a zero position i. e. a position indicating level flight before going into aerobatics.

However, it often happens that the pilot forgets to uncage the gyroscope gimbal system when normal flight is resumed with the result that the pilot is misled by the normal flight indication of the instrument into believing that the aircraft is in a position of normal flight whereas the aircraft may actually be flying in a dangerous attitude.

It is therefore the principal object of this invention to provide a means for positively indicating to the pilot when an instrument of the class described is caged or uncaged.

A specific object is to provide an indication for a pilot or other user when the gyroscopic element of a gyro operated instrument is caged, which includes a target or other suitable indicator that is moved from a hidden position when the gyroscopic element is uncaged into the open field portion of the face of the instrument (where the instrument's indication is viewed) when the gyroscopic element is caged.

Another specific object is to provide a gyroscope caging indicator in accord with the preceding object in which the indicating member occupies a position across at least a portion of the instrument's indication when the gyroscope is caged.

A more specific object is to provide a device for indicating to the pilot when a gyroscopic instrument of the type described is caged which comprises a target attached to one of the caging rings of the instrument and rotated from a hidden position into full view of the pilot as the latter manipulates the caging rings.

These and other objects of my invention will become more apparent from the detailed description to follow when considered with the accompanying drawing which illustrates a preferred embodiment of the invention.

In the drawing, in which like reference characters are used to indicate like parts in the several views presented:

Fig. 1 is a plan view of an artificial horizon instrument constructed according to my invention, the outer case being shown in section;

Fig. 2 is a side elevation of the instrument shown in Fig. 1, the outer case also being shown in section;

Fig. 3 is a front view of the instrument showing the position of the target type indicator when the instrument is in the uncaged position; and, Fig. 4 is also a front view showing the position of the indicator when the instrument is in a caged position.

Referring now to the drawing; the artificial horizon instrument is shown as enclosed within an outer air tight case 10 having a forward window 11 through which the horizon bar 12 is visible. The rotor of the gyroscope (not shown) is mounted within a casing 13 by means of a gimbal ring 14 pivoted on the fore and aft axis 15—15 within the case 10. The casing 13 is pivoted within the gimbal ring 14 on a transverse axis 16—16.

For centralizing or "caging" the gyroscope, there are provided a pair of rings 18 and 19 rotatably mounted within the case 10 and having gear teeth 20 and 21, respectively on the inner edges thereof. These teeth mesh with a gear 22 which is secured to a stub shaft 23 which is journalled on the side of the case 10 and provided with a beveled pinion gear 24 on the outer end thereof.

A knob 25 secured to a shaft 26, when pulled outwardly against the opposing action of a spring 27, meshes another beveled gear 28 secured on the shaft 26 with the pinion gear 24. Thus rotation of the knob 25 when gears 24 and 28 are in mesh effects rotation of caging ring 18 in one direction and rotation of caging ring 19 in an opposite direction. The ring 18 is provided with a finger 29 which projects inwardly towards the caging ring 19. A similar finger (not shown) projects from the caging ring 19 towards caging ring 18. An L shaped pin 30 projects from the gyroscope casing 13 through an annular slot 31 in the gimbal ring 14 and extends from a point at one side of the axis 16—16 so that when the pin is engaged, it locks or cages the gyroscope casing 13 about both axes 15—15 and 16—16, bringing it to a neutral position. The pin 30 may be used as the pin normally employed to move the horizon bar 12 up and down, the pin 30 passing through a slot 32 in the long lever 33 which is pivoted on the gimbal ring 14 at 34.

When the gyroscope is caged, the bar 12 will indicate normal, level flight.

Thus in order to cage the gyroscope casing 13 in a neutral position it is only necessary to continuously rotate the knob 25 with the gears 24 and 28 in mesh thereby rotating the caging rings 18 and 19 in opposite directions until the finger 29 carried by ring 18 and the similar finger carried by ring 19 grasp the pin 30 between them and fix it securely in position. For a more complete description of the construction and operation of the caging apparatus, reference may be had to U. S. Patent No. 2,018,735 issued October 29, 1935.

From the foregoing description, it will be obvious that it is impossible for the pilot to tell from looking at the instrument whether or not the device is caged or uncaged. Therefore in order that the pilot may have a positive indication of the condition of the device, a target 35 is provided. This target which may, if desired, be inscribed with suitable indicia such as "Caged" is the down turned portion of a bracket 36, the latter being secured by rivets to the caging ring 18. The arrangement is such that when the gyroscope is fully uncaged and therefore in an operative position, the target 35 is hidden from view, being disposed behind a tongue portion 37 of the face 38, the tongue portion being used to support a reference "aeroplane" 39 which with the horizon bar 12 is viewed by the pilot in the open field portion of the face 38 as in Fig. 3.

When, however, the knob 25 is rotated, thereby rotating the caging rings 18 and 19 towards a caging position, the target 35 will likewise be turned from the position in Fig. 3 to that in Fig. 4 where it will be in full view of the pilot. In Fig. 4, the target 35 is shown in the position it occupies when the gyroscope is fully caged. However, it will be evident that since the tongue 37 is relatively narrow, the target 35 will also be visible to the pilot in all positions of the caging rings 18, 19 except the position in which the gyroscope is fully uncaged.

In conclusion, it will be evident that my invention provides a means whereby the pilot can tell at a glance whether or not the horizon instrument is caged or uncaged. It will likewise be evident that various changes and modifications in the present embodiment may occur to and be made by others skilled in the art without departing from the spirit and scope of my invention as defined in the appended claims.

The invention described herein may be manufactured and used by or for the Government of the United States of America for governmental purposes without the payment of any royalties thereon or therefor.

Having thus fully described my invention, I claim:

1. In a gyroscopic instrument including a casing having a window portion through which the instrument's indication is viewed, a gyroscope mounted within said casing and caging means operable by a user for locking said gyroscope to prevent movement thereof relative to said casing; means cooperable with said caging means for indicating to said user the position of said caging means, last said means being visible to said user in said window portion when said gyroscope is caged but hidden from view when said gyroscope is fully uncaged.

2. In a gyroscopic instrument including a casing having a window portion through which the instrument's indication is viewed, a gyroscope mounted within said casing and caging means operable by a user for locking said gyroscope to prevent movement thereof relative to said casing; means cooperable with said caging means for indicating to said user the position of said caging means, last said means comprising a member movable into said window portion and positioned across at least a portion of the instrument indication when said gyroscope is caged.

3. In a gyroscopic artificial horizon instrument including a casing, a gyroscope mounted within said casing, caging means operable by a user for locking said gyroscope to prevent movement thereof relative to said casing and a face including an open field portion for observing the horizon bar of said instrument and a tongue portion projecting into said field portion; target means cooperable wth said caging means for indicating to said user the position of said caging means, said target means being hidden from view behind said tongue portion when said gyroscope is fully uncaged but movable into the field portion of said face upon operation of said caging means.

4. In a gyroscopic artificial horizon instrument including a casing, a gyroscope universally pivoted thereon on two normally horizontal axes, a face including an open field portion for observing the horizon bar of said instrument and a tongue portion projecting into said field portion, a pair of rings rotatably mounted within said casing, means operable by a user for rotating said rings, and means carried by said rings for engaging said gyroscope to cage the latter about both of said axes as said rings are rotated; target means carried by one of said rings for indicating to said user the position of said rings, said target means being hidden from view behind the tongue porton of said face when said gyroscope is fully uncaged but movable into the field portion of said face upon rotation of said rings towards a caging position.

5. In a gyroscopic instrument including a casing, a face having an open field portion in which the instrument's indication is viewed, a gyroscope gimballed within said casing, and caging means for locking said gyroscope; means cooperable with said caging means for indicating the position of said caging means, last said means being visible in said field portion when said gyroscope is at least partially caged but hidden from view when said gyroscope is uncaged.

6. The invention defined in claim 5 wherein last said means comprises a target member.

7. In a gyroscopic instrument including a casing, a face having an open field portion in which the instrument's indication is viewed, a gyroscope gimballed within said casing, and caging means for locking said gyroscope; means for indicating the position of said caging means, last said means being movable with operation of said caging means into said field portion when said gyroscope is at least partially caged.

8. The invention defined in claim 7 wherein last said means comprises a target member.

9. The invention defined in claim 7 wherein last said means is positioned across at least a portion of the instrument's indication when said gyroscope is caged.

PLINY G. HOLT.